US012563015B2

(12) United States Patent
Combier

(10) Patent No.: US 12,563,015 B2
(45) Date of Patent: Feb. 24, 2026

(54) SECURE TRANSFER GATEWAY

(71) Applicant: ARC DATA SHIELD, Les Sorinieres (FR)

(72) Inventor: Arnaud Combier, Mions (FR)

(73) Assignee: ARC DATA SHIELD, Les Sorinieres (FR)

( * ) Notice: Subject to any disclaimer, the term of this patent is extended or adjusted under 35 U.S.C. 154(b) by 110 days.

(21) Appl. No.: 18/576,863

(22) PCT Filed: Jul. 7, 2022

(86) PCT No.: PCT/FR2022/051364
§ 371 (c)(1),
(2) Date: Jan. 5, 2024

(87) PCT Pub. No.: WO2023/281223
PCT Pub. Date: Jan. 12, 2023

(65) Prior Publication Data
US 2024/0333685 A1     Oct. 3, 2024

(30) Foreign Application Priority Data
Jul. 7, 2021    (FR) ..................................... 21 07339

(51) Int. Cl.
H04L 9/40        (2022.01)

(52) U.S. Cl.
CPC ........ H04L 63/0263 (2013.01); H04L 63/123 (2013.01); H04L 63/18 (2013.01)

(58) Field of Classification Search
CPC .... H04L 63/0263; H04L 63/123; H04L 63/18
See application file for complete search history.

(56) References Cited

U.S. PATENT DOCUMENTS

2005/0015624 A1*   1/2005   Ginter ................... H04L 63/145
                                             726/4
2008/0098464 A1*   4/2008   Mizrah ................... G06F 21/36
                                             726/5

(Continued)

FOREIGN PATENT DOCUMENTS

EP          3829101 A1     6/2021
WO     2019215442 A1   11/2019

OTHER PUBLICATIONS

International Search Report issued Sep. 1, 2022, in corresponding International Application No. PCT/FR2022/051364, 6 pages.

(Continued)

*Primary Examiner* — Kristie D Shingles
(74) *Attorney, Agent, or Firm* — Maier & Maier, PLLC

(57) ABSTRACT

A transfer device for transferring digital data, in a communication system, between a first network and a second network. The device includes a first interface with the first network, a second interface with the second network, a third interface with a transfer controller for controlling the transfer of digital data through the transfer device, and a fourth interface arranged to be connected to at least one transfer memory. The transfer device is configured to activate successively, in a respectively exclusive manner: a first transmission channel through the first and fourth interface, a second transmission channel through the third and fourth interface, and a third transmission channel through the second and fourth interface.

14 Claims, 2 Drawing Sheets

(56) References Cited

U.S. PATENT DOCUMENTS

| | | | |
|---|---|---|---|
| 2013/0100963 A1 | 4/2013 | Hartman | |
| 2014/0245391 A1* | 8/2014 | Adenuga | G06F 21/42 |
| | | | 726/3 |
| 2017/0359383 A1 | 12/2017 | Rogers et al. | |
| 2020/0252375 A1* | 8/2020 | Chen | H04L 12/465 |
| 2022/0416820 A1* | 12/2022 | Cho | H04B 1/00 |

OTHER PUBLICATIONS

Office Action issued on Jun. 18, 2025, in corresponding Korean Application No. 10-2024-7000551, 12 pages.
Office Action issued on Jan. 28, 2025, in corresponding Japanese Application No. 2024-501134, 12 pages.

\* cited by examiner

SECURE TRANSFER GATEWAY

FIELD

This invention relates to the field of information system security. More specifically, this invention relates to a device for transferring digital data. This invention also relates, in a non-exhaustive manner, to a communication system comprising such a device, to a method for transferring digital data making use of such a device in such a system, and to a computer program designed for controlling such a device.

BACKGROUND

The development of cellular networks such as 5G, the growing virtualization of computer networks, or the appearance and spread of the Internet of Things, are all examples of a current general trend towards the decentralization of digital communications, both in the personal and in the professional sphere.

By necessity, this movement is accompanied by growth in and an increasing complexity of security systems, in order to cope with recurring issues such as protecting industrial and commercial secrets or privacy.

Another ongoing challenge is maintaining the security of computer systems connected to hospitals, or in the defense field, or distributed control systems for large networks and infrastructures, particularly for the distribution of fluids (water, gas, etc.), or in transport, as such systems can undergo sophisticated attacks.

In this general context, it is known to provide various security components at the devices which interconnect computer networks, such as network gateways or routers, in order to help keep digital data transfers secure.

An example of such a security component is the insertion of a hardware firewall. Such a device has two network interfaces at the minimum, analyzes the data passing through it, and checks whether this data corresponds to predefined rules. These rules can be of several types. For example, it is possible to ask the firewall to systematically reject all requests coming from a specific domain, or all requests using a specific protocol, or all those relating to such and such a port number.

A disadvantage of a hardware firewall is that the filtering is complex to implement. Additionally, illegitimate data could remain not filtered as it is either masked by encryption or provided in the same format as legitimate data.

Another example of a security component is a protocol-breaking gateway making use of a double conversion element.

A protocol-breaking gateway has the effect of not allowing a direct communication session to be established between a client and a server, but, in contrast, intercepts such a session. The protocol-breaking gateway comprises a "pseudo-server" module communicating with the client using a protocol recognized by the client, a "pseudo-client" module communicating with the server using a protocol recognized by the server, and a filter integrating the double conversion element. The filter connects the pseudo-server module to the pseudo-client module, employs a restricted protocol, and thus implements two successive protocol conversions, namely between the client protocol and the restricted protocol on the one hand, and between the server protocol and the restricted protocol on the other hand.

The goal is twofold: to prevent attacks linked to a specific protocol and to allow the content of communications to be inspected.

A disadvantage of protocol breaking is that it does not allow the transmission of all possible legitimate data, but only that of data compatible with the restricted protocol. Another disadvantage of protocol breaking is that some illegitimate data can still pass through via the restricted protocol.

Another example of a security component is a network diode. A network diode is unidirectional: it receives digital data from an upstream window placed on a source network, and transmits this digital data to a downstream window placed on a destination network to be protected. Of course, it is possible to arrange two diodes to allow bidirectional exchanges.

A disadvantage of network diodes is that the security of exchanges depends on the integrity of the transfer windows placed on the networks to be secured. In practice, any corruption of the upstream window leads to loss of control of the data transfer and a risk of illegitimate transmission to the downstream window.

Generally speaking, the higher the level of security offered by existing security components, the more they degrade the possibility of exchanges but without ever achieving complete partitioning of the networks to be secured.

To further secure transfers of digital data between two separate computer networks, it is desirable to overcome the above disadvantages.

It is also desirable to be able to verify the legitimacy of a transfer between two computer networks, as well as the legitimacy of the digital data to be transferred, in a manner that is independent of the networks involved.

SUMMARY

This disclosure improves the situation.

According to one aspect of the invention, a transfer device is proposed for transferring digital data, in a communication system, between a first network and a second network, the device comprising:

a first communication interface with the first network, a second communication interface with the second network, a third communication interface with a transfer controller for controlling the transfer of digital data through the transfer device, and a fourth communication interface arranged to be connected to at least one transfer memory, the transfer device being configured to activate successively, in a respectively exclusive manner:

a first transmission channel through the first and fourth communication interface, a second transmission channel through the third and fourth communication interface, and a third transmission channel through the second and fourth communication interface.

Due to the specific architecture of this transfer device for transferring digital data, complete partitioning between the two networks is obtained, in the sense that no physical connection between these two networks is ever established.

Furthermore, again due to the specific architecture of this transfer device for transferring digital data, the transfer controller for controlling the transfer of digital data can be made independent and devoid of any connection with the networks to be partitioned, regardless of their level of corruption.

It is possible that the device further comprises a transfer memory connected to the fourth communication interface, or possibly several transfer memories connected to the fourth communication interface.

The transfer memory is a digital data storage device such as random access memory (RAM), flash memory (SD card, USB stick), a hard disk drive (HDD), or a solid state disk (SSD), for example. Thus connected to the fourth communication interface, such a transfer memory serves as a medium for temporarily storing the data being transferred. This medium can be successively connected, by the transfer device, to the first network, then to the transfer controller, and finally to the second network, in order to transfer data from the first network to the second network, with an intermediate verification carried out by the transfer controller. Symmetrically, this medium can be successively connected, by the transfer device, to the second network, then to the transfer controller, and finally to the first network in order to transfer data from the second network to the first network, with an intermediate verification carried out by the transfer controller.

For example, the transfer memory may comprise:
    a first partition dedicated to storing digital data being transferred from the first network to the second network, and
    a second partition dedicated to storing digital data being transferred from the second network to the first network.

Thus, when the transfer device successively activates the first transmission channel then the second transmission channel, it is expected that only the first partition will contain data coming from the first network and to be transferred to the second network. It can therefore be expected that in such a situation, the transfer controller automatically erases any contents of the second partition in order to avoid an illegitimate transfer to the second network.

According to another aspect of the invention, a communication system between a first network and a second network is proposed, the system comprising:
    the above transfer device for transferring digital data, and
    a transfer controller for controlling the transfer of digital data through the transfer device, said transfer controller being connected to the third communication interface of the transfer device and being independent of both the first network and the second network.

"Independent of the first network and second network" is understood to mean that the transfer controller is devoid of any physical data connection, bus or network, even temporary, with these two networks. As a result, the transfer controller is not likely to receive instructions from any potentially corrupt entity belonging to one of these two networks.

The transfer device combined with the transfer controller makes it possible to manage, end-to-end, any form of data exchange between the first network and the second network, independently of the two networks. Thus, even if a source of data to be transferred which is located in one of the two networks is corrupted, this source is not able to control either the transfer controller or, directly or indirectly, the transfer device.

For example, the transfer controller can further be configured to control the successive activation of the transmission channels by the transfer device. For example, such control can be carried out by means of all-or-nothing signals not passing through the transmission channels. If the successive activation of the transmission channels can only be physically triggered by the transfer controller, then the operation of the transfer device is made independent of the first network and of the second network. As a result, it is physically impossible for a malicious actor to take control of the transfer device using logic instructions coming from either of the two networks.

For example, the transfer controller may further be configured to control a first slave controller connected to the first network, with a view to transmitting to the transfer memory, via the first transmission channel, a first set of incoming digital data coming from the first network, and to store said first set of incoming data as a first set of data being transferred. For example, the transfer controller may signal to the first slave controller whether the first transmission channel is active. This makes it possible to trigger an exchange of data between the first network and the transfer memory as soon as the first transmission channel is active, and to stop such an exchange of data as soon as the first transmission channel is no longer active. In this example, the transfer controller acts, from the point of view of the first network, as a regulator of an intermittent exchange of digital data with the second network.

For example, the transfer controller may further be configured to obtain, via the second transmission channel, the first set of data being transferred in order to perform a verification of said first set of data being transferred, said verification providing a first result indicative of compliance with or violation of at least one security rule relating to said first set of data being transferred. The security rules are guided by a predetermined security policy and may, for example, relate to the confidentiality and/or integrity of the digital data being transferred. Verification of data being transferred may comprise, for example, running an antivirus or checking transfer rights.

For example, the transfer controller may further be configured to control a second slave controller connected to the second network, with a view to transmitting the first set of data being transferred, to the second network, via the third transmission channel, as a first set of outgoing digital data, only when the first result is not indicative of any security rule violation. This indicates that the transfer of the first set of data to the second network is authorized by the transfer controller.

For example, the transfer controller may further be configured to erase, from the transfer memory, data of the first set of data being transferred, without first transmitting them via the third transmission channel, when the first result concerning the data is indicative of a violation of at least one security rule. For example, consider that the transfer controller detects, at a given moment, a violation of a security rule relating to the first set of data being transferred. At this given moment, the second transmission channel is active, therefore the transfer memory is not connected to either the first network or the second network, but is connected to the transfer controller. The transfer controller can therefore specifically erase some or all of the data in the first set of data being transferred, or can erase the entire contents of the transfer memory. If the transfer memory comprises several partitions including a partition dedicated to the transfer of data from the first network to the second network, it is possible to provide that the entire content of this partition is erased.

For example, the system may be further configured to:
    control the second slave controller, with a view to transmitting to the transfer memory, via the third transmission channel, a second set of incoming digital data coming from the second network, and to store said second set of incoming data as a second set of data being transferred, obtain, via the second transmission channel, the second set of data being transferred, with a view to performing a verification of said second set of data being transferred, said verification providing a second result indicative of compliance with or violation of at least one security rule relating to said second set of data being transferred, control the first slave controller, with a view to transmitting to the first network, via the first transmission channel, the second set of data being transferred, as a second set of outgoing digital data, only when the second result is not indicative of any security rule violation, and erase, from the transfer memory, data of the second set of data being transferred, without first transmitting it via the first transmission channel, when the second result concerning the data is indicative of a violation of at least one security rule.

Thus, the transfer controller verifies both the data coming from the first network and intended for the second network and the data coming from the second network and intended for the first network. The transfer controller therefore verifies all data exchanges between the first network and the second network in and of themselves, as well as their content, meaning all the data to be exchanged between the first network and the second network, in one direction or the other, before authorizing or refusing their actual transfer.

According to another aspect of the invention, a method is proposed for transferring digital data, in a communication system, between a first network and a second network, by means of a transfer device comprising:

a first communication interface with the first network, a second communication interface with the second network, a third communication interface with a transfer controller for controlling the transfer of digital data through the transfer device, a fourth communication interface, and a transfer memory connected to the fourth communication interface, the method comprising a successive activation, in a respectively exclusive manner, of a first transmission channel through the first and fourth communication interface, a second transmission channel through the third and fourth communication interface, and a third transmission channel through the second and fourth communication interface.

The method may, for example, further comprise:

transmission to the transfer memory, via the first transmission channel, of a first set of incoming digital data coming from the first network, with a view to their transfer as a first set of data being transferred, communication to the transfer controller, via the second transmission channel, of the first set of data being transferred, with a view to performing a verification of said first set of data being transferred, said verification providing a first result indicative of compliance with or violation of at least one security rule relating to said first set of data being transferred, transmission to the second network, via the third transmission channel, of the first set of data being transferred, as a first set of outgoing digital data, only when the first result is not indicative of any security rule violation, and erasure, from the transfer memory, of the first set of data being transferred, when the first result is indicative of a violation of at least one security rule.

The method may for example further comprise the following steps implemented by the transfer controller:

the transfer device triggers activation of the first transmission channel, a start of transmission signal is sent to a first slave controller connected to the first network, after an allotted time, an end of transmission signal is sent to the first slave controller, activation of the second transmission channel is triggered, contents of the transfer memory are read and verified, optionally, some or all of the contents of the transfer memory are erased, and activation of the third transmission channel is triggered.

According to another aspect of the invention, a computer program is proposed comprising one or more instructions for implementing the above method when this program is executed by a processor.

BRIEF DESCRIPTION OF DRAWINGS

Other features, details, and advantages will become apparent upon reading the detailed description below, and upon analyzing the appended drawings.

DETAILED DESCRIPTION

The aim of the invention is to ensure a transfer of digital data between different networks without ever establishing a physical communication between these networks. Throughout this document, the simplified term "data" is understood to refer systematically to digital data.

Thus, it is proposed to transport data coming from a source network to a controller that is independent of the different networks, then, once a verification has been carried out, to transport the verified data to a destination network. The stream is transferred intermittently and in one direction at a time, but at a high throughput and without alteration of the transmitted data, while ensuring a physical decoupling between the different networks.

Many applications are possible, in particular for companies and organizations possessing multiple information systems having either different functions or different data sensitivities, requiring rapid transfers that are regular to almost continuous in frequency, and in which the security objective requires the highest level of partitioning, with no network connection between these information systems or with external systems.

For example, for hospitals, the invention can be applied to the management of data transfers between the computer networks of medical devices and the administrative computer networks. For organizations of vital importance such as an energy producer or a transportation manager, the invention can be applied to the management of digital data transfers between networks hosting industrial equipment and networks for production management and office automation. Organizations in the defense field can apply the invention to managing transfers between computer networks hosting data of varying sensitivity but still requiring internetwork exchanges.

Figure 1:
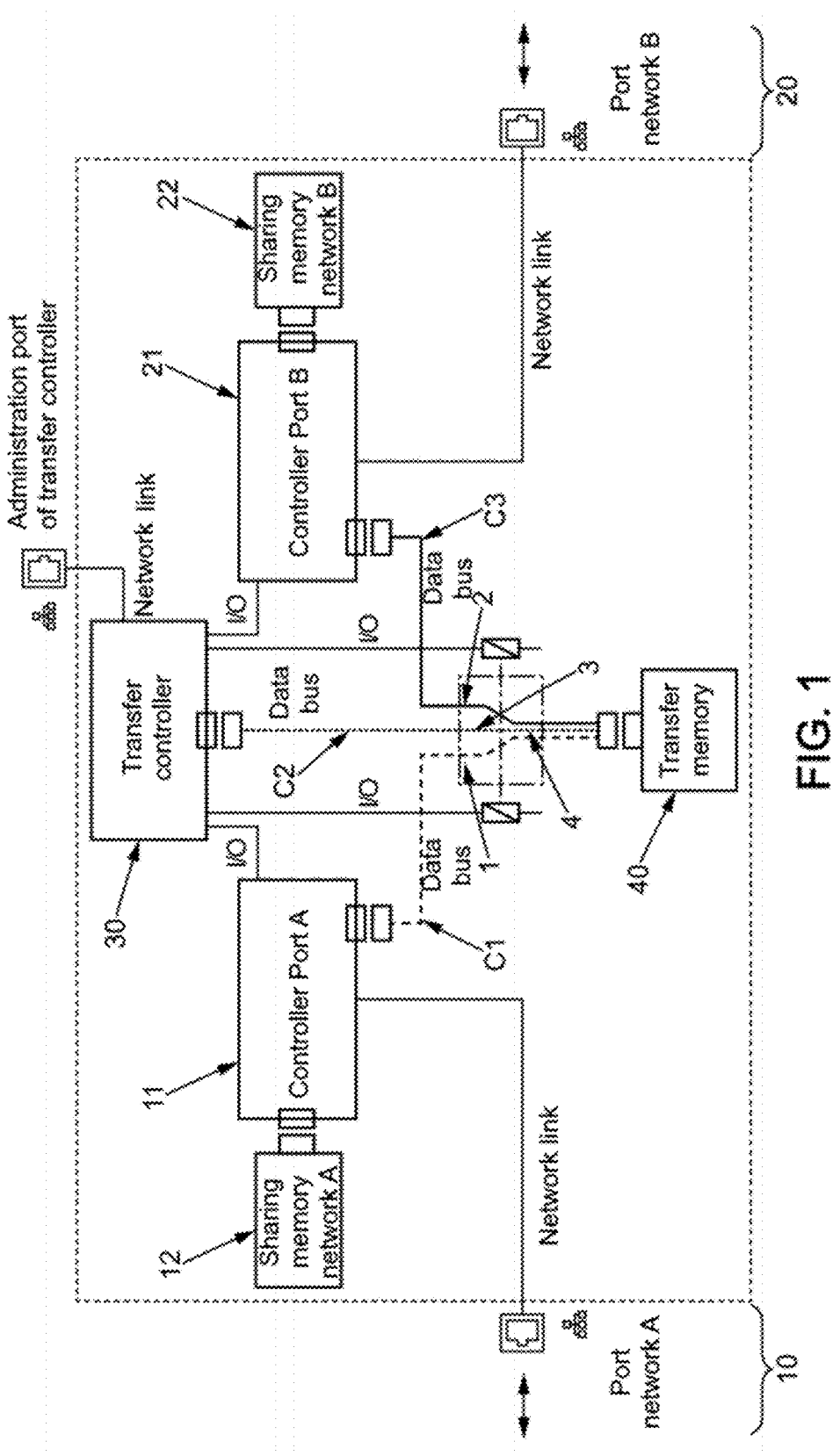
FIG. 1 is a functional diagram of a communication system in an exemplary embodiment of the invention.
Figure 2:
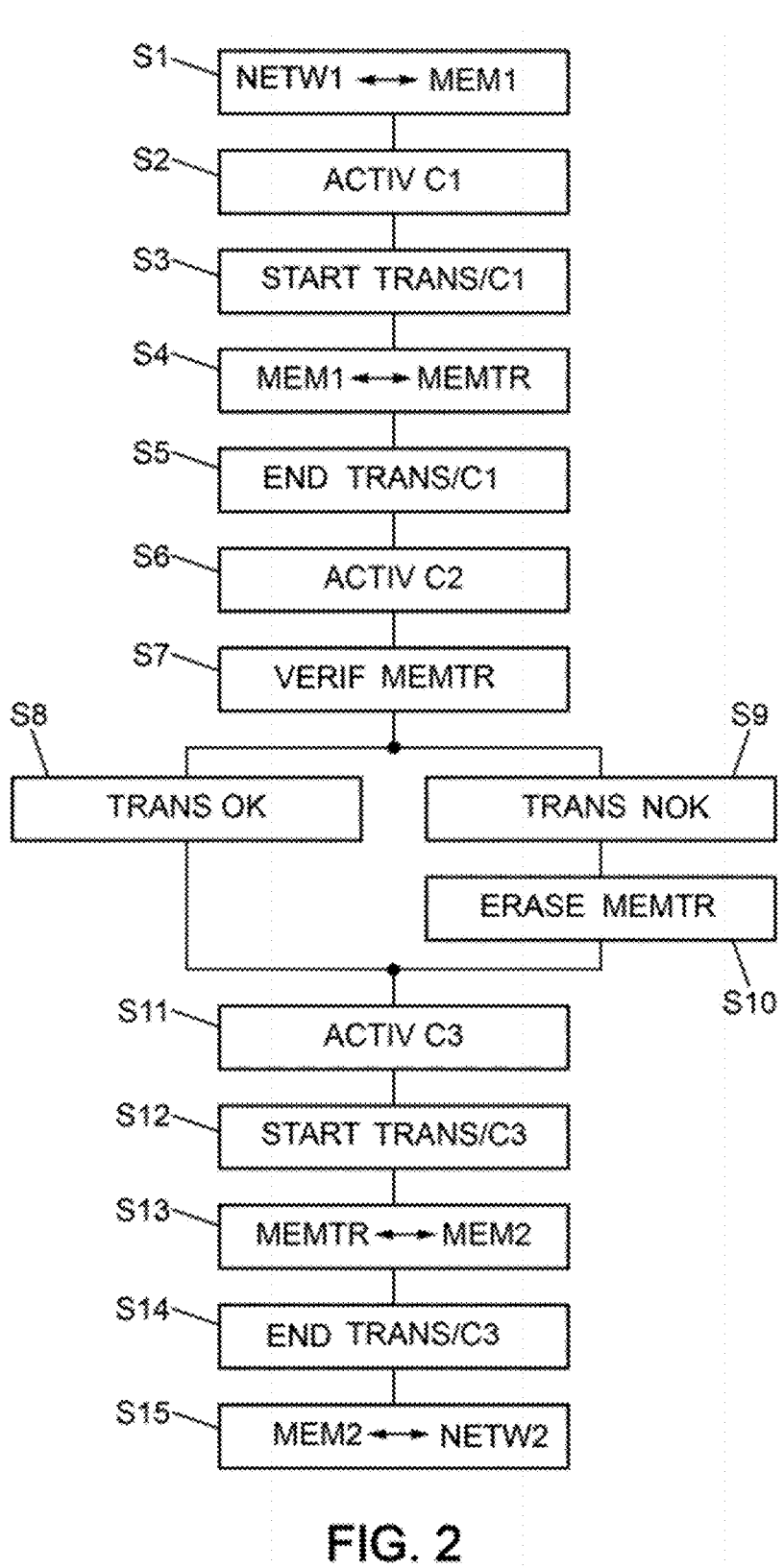
FIG. 2 illustrates a general algorithm of a method for transferring digital data in an exemplary embodiment of the invention, for example in such a communication system.

We now refer to FIG. 1, which functionally illustrates an example of a communication system, and to FIG. 2, which illustrates an example of an algorithm for transferring data between different networks, such an algorithm being applicable to such a communication system.

A device for transferring digital data is shown, this device having four communication interfaces 1, 2, 3, 4.

First communication interface 1 is connected, via a first data bus, to a first controller 11. This first controller is equipped with a network link to a first network 10 and is connected to a first sharing memory 12. First controller 11 associated with first sharing memory 12 provides, from the point of view of first network 10, two network shares for respectively accommodating S1 the outgoing digital data and the incoming digital data.

Second communication interface 2 is connected, via a second data bus, to a second controller 21. This second controller is equipped with a network link to a second network 20 and is connected to a second sharing memory 22. Second controller 21 associated with second sharing memory 22 provides, from the point of view of second network 20, a network share for accommodating outgoing digital data and incoming digital data.

Third communication interface 3 is connected, via a third data bus, to a transfer controller 30. This transfer controller acts as a master controller for first controller 11 and second controller 21, as well as a controller over the operation of the transfer device for transferring digital data.

Fourth communication interface 4 is connected to a transfer memory 40 intended to temporarily store data being transferred. Optionally, transfer memory 40 is detachably connected to fourth communication interface 4: this is the case for example of a USB key or an external hard drive.

Within the digital data transfer device, at each moment, fourth communication interface 4 can be connected to only one other interface among the three other communication interfaces 1, 2, 3, for example at the command of transfer controller 30.

This means that transfer controller 30 can send, to the transfer device for transferring digital data:

- a command to activate a first transmission channel C1 through the first and fourth communication interface, or
- a command to activate a second transmission channel C2 through the third and fourth communication interface, or else
- a command to activate a third transmission channel C3 through the second and fourth communication interface.

Activation of one of the transmission channels is accompanied by simultaneous deactivation of the two other transmission channels, such that, in particular:

- no physical connection between first network 10 and second network 20 is ever established, and
- no physical connection between first or second network 10, 20 on the one hand, and transfer controller 30 on the other hand, is ever established either.

In concrete terms, the commands for activating the transmission channels can simply be associated with signals which allow for at least three possible values. For example, a default position where the third channel is activated can be defined. The activation signals can thus be coded in two bits and allow two possible values, for example "10" for activation of the first transmission channel and "01" for activation of the second transmission channel. Any other coding, i.e. "00" and "11", then corresponds to the default position, i.e. activation of the third transmission channel. Such activation commands can therefore be summarized, in other words, as the controlling, by transfer controller 30, of two all-or-nothing devices, i.e. two binary switches within the transfer device for transferring digital data. These all-or-nothing exchanges, represented in FIG. 1 by I/O, do not constitute data links.

When first transmission channel C1 is activated S2, data can be exchanged S4 between first sharing memory 12 and transfer memory 40. Specifically, outgoing digital data from first network 10 that was previously stored in first sharing memory 12 can be transmitted to and stored in transfer memory 40. Symmetrically, incoming data previously stored in transfer memory 40 can also be transmitted to and stored in first sharing memory 12, with a view to being transferred to first network 10.

Incoming and outgoing data may for example be stored in different partitions of transfer memory 40. In other words, a first partition can be dedicated to a transfer of digital data from first network 10 to second network 20, while a second partition can be dedicated to a transfer of digital data from second network 20 to first network 10.

These transfers of digital data may for example be initiated, or triggered S3, by the transmission of a control signal by transfer controller 30 as the master controller, to first controller 11 as a slave controller. Such a control signal can thus essentially indicate to first controller 11 that transfer memory 40 is connected and that that the uni- or bidirectional transfer can begin. Given its simplicity, such a control signal can be transmitted via a direct connection between transfer controller 30 and first controller 11 by means of a single all-or-nothing exchange, meaning by actuating a single all-or-nothing device such as a switch.

Once the transfers of digital data between first sharing memory 12 and transfer memory 40 have been completed S5, first controller 11 can in turn so inform transfer controller 30 in the form of a new all-or-nothing exchange. Following such an all-or-nothing exchange, or after expiration of a predetermined time allocated to transfers of digital data between transfer memory 40 and first sharing memory 12, transfer controller 30 can order S6 the activation, by the transfer device for transferring digital data, of second transmission channel C2.

When second transmission channel C2 is activated, transfer memory 40 is, as already indicated, connected to transfer controller 30 and disconnected from the two controllers 11, 21 of sharing memories 12, 22, and therefore, due to this, from each of the two networks 10, 20.

At this stage, transfer memory 40 is capable of storing data being transferred from first sharing memory 12, possibly in a dedicated partition.

Transfer controller 30 can read the contents of transfer memory 40 for verification purposes S7.

One goal may be to verify the legitimacy of the exchange in progress. For example, it may be provided that the data being transferred must necessarily be accompanied by a signature authenticating the issuer. In other words, it may be provided that the transfer controller only authorizes the transfer of data if such a signature is present.

Transfer controller 30 may also have access to a lookup table associating different potential sources with the respective rights assigned to them. Transfer controller 30 can then check the rights assigned to the source of the data being transferred, this source being authenticated by its signature, in order to authorize or not authorize the transfer of the data stored in transfer memory 40.

Another goal that can be achieved by transfer controller 30 reading the contents of transfer memory 40 is the verification of the actual data that is being transferred. This verification may include verifying the data's harmlessness by means of an antivirus for example and/or verifying the data's authenticity, for example by cryptographic techniques, and/or may include verifying the format, size, or integrity of the data.

Generally speaking, each data verification carried out by transfer controller 30 returns a result indicative of either a violation of or compliance with a predetermined security rule relating to said data.

The security rules may be differentiated according to the target network, meaning that a first set of security rules may be provided for any data intended to be transferred to first network 10, and a second set of security rules may be provided for any data intended to be transferred to second network 20.

If at least one predefined security rule is violated, for example if the transfer is illegitimate, or if the data coming from first network 10 and being transferred presents a security risk or is not authentic, it is appropriate that the transfer of these data not be authorized S9, i.e. they are not sent to second network 20. To do this, it may be provided that transfer controller 30 orders S10 the erasure of said data.

Conversely, if none of the predefined security rules are violated, i.e. if for example the transfer controller considers that the transfer is legitimate and that the data coming from first network 10 and being transferred are authentic as well as posing no security risk for second network 20, then it may be provided that transfer controller 30 authorizes S8 the transfer.

It may be provided that transfer controller 30 records in a log the results of each verification or each control action resulting either in an authorization of the transfer or in an erasure of data stored in transfer memory 40.

Next, the device for transferring digital data can activate S11 third transmission channel C3, for example at the command of transfer controller 30.

When third transmission channel C3 is activated, transfer memory 40 is, as already indicated, connected to second network 20 and disconnected from both first network 10 and transfer controller 30. At this stage, the data being transferred that are stored in transfer memory 40 have previously been the subject of a transfer authorization by transfer controller 30, otherwise they would have been erased.

A data exchange S13 between transfer memory 40 and second sharing memory 22 is then possible.

This exchange can be carried out by second controller 21 which, from the point of view of second network 20, takes charge of the network sharing functions for respectively accommodating the incoming and outgoing data.

Indeed, when third transmission channel C3 is activated, second controller 21 can move the data from transfer memory 40 to second sharing memory 22. Second controller 21 can also, in parallel, move to transfer memory 40 the data coming from second network 20 and previously stored in second sharing memory 22.

Communication between transfer controller 30 as master controller, and second controller 21 as slave controller, can be provided and carried out in a manner analogous to what has already been described between transfer controller 30 and first controller 11.

An example of such a communication is described below. Initially, following activation of third transmission channel C3, transfer controller 30 signals to second controller 21, by an all-or-nothing exchange, that the data transfer can begin S12. In a second step, a unidirectional or bidirectional transfer of data takes place S13 between second sharing memory 22 and transfer memory 40, this transfer being controlled by second controller 21. Finally, in a third step, second controller 21 signals to transfer controller 30, again by an all-or-nothing exchange, that the data transfer has ended S14.

We have described the general mechanism for transferring a first set of data from first sharing memory 12 linked to first network 10 to second sharing memory 22 linked to second network 20. The data present in second sharing memory 22 can then be sent out S15 over second network 20.

According to this mechanism, the transfer can be controlled end-to-end by a single master controller, namely transfer controller 30, for which the operation can be rendered completely independent of any entity linked to one or the other of the two networks 10, 20. In particular, second interface 2 cannot physically be connected to first or to third interface 1, 3.

Furthermore, since no connection is ever established between first interface 1 and third interface 3, neither transfer controller 30 nor the transfer device for transferring digital data can be physically bypassed.

The general mechanism for transferring a second set of data in the opposite direction, meaning from second sharing memory 22 linked to second network 20, to first sharing memory 12 linked to first network 10, operates in a manner similar to the transfer just described.

Transfer device for transferring digital data is considered to have activated S11 third transmission channel C3 and that the second set of data has been transferred S13 from second sharing memory 22 to transfer memory 40. The end of this transfer S14 may for example be signaled to transfer controller 30 by the second controller by means of an all-or-nothing signal. Alternatively, transfer controller 30 can predict the end of this transfer as corresponding to the expiration of a pre-established period starting for example at the moment of activation of third transmission channel C3.

Transfer controller 30 can therefore command the transfer device for transferring digital data, which once again activates S6 second transmission channel C2.

A verification S7, by transfer controller 30, of the legitimacy of the new exchange in progress, as well as of the integrity and authenticity of the data transferred to transfer memory 40 from second sharing memory 22, can then follow. At the end of this verification, the transfer of said data to first network 10 can either be authorized S8 or refused S9.

In the event of refusal, transfer controller 30 can thus erase S10 the data in the process of being transferred from transfer memory 40.

After this verification, and, in the event of refusal of the transfer, after the erasure of the corresponding data, transfer controller 30 can command the transfer device for transferring digital data so that the device once again activates S2 first transmission channel C1.

The second set of data can then be transferred S4 from transfer memory 40 to first sharing memory 12. This transfer of the second set of data may, as already described, be controlled by first controller 11, itself controlled by transfer controller 30.

The transfer device for transferring digital data thus makes it possible to carry out a bidirectional data transfer between two networks without ever establishing a physical connection between these two networks. In addition, this bidirectional data transfer can be controlled by a transfer controller which can be made completely independent and permanently devoid of any physical connection with either of these two networks.

The invention claimed is:

1. A transfer device for transferring digital data, in a communication system, between a first network and a second network, the device comprising:

a first communication interface with the first network, a second communication interface with the second network, a third communication interface with a transfer controller for transferring digital data through the transfer device, and a fourth communication interface arranged to be connected to at least one transfer memory, the transfer device being configured to receive successively:

first a first command to activate a first transmission channel through the first and fourth communication interface, then a second command to activate a second transmission channel through the third and fourth communication interface, and finally a third command to activate a third transmission channel through the second and fourth communication interface, the commands resulting from controlling, by a transfer controller, two binary switches within the transfer device, the transfer device being configured to:

after receiving the first command to activate the first transmission channel, simultaneously activate the first transmission channel and deactivate the second and third transmission channels, after receiving the second command to activate the second transmission channel, simultaneously activate the second transmission channel and deactivate the first and third transmission channels, and after receiving the third command to activate the third transmission channel, simultaneously activate the third transmission channel and deactivate the first and second transmission channels, such that no physical connection between the first network and the second network is ever established, and no physical connection between the first or second network on the one hand, and the transfer controller on the other hand, is ever established.

2. The device according to claim 1, comprising at least one transfer memory connected to the fourth communication interface.

3. The device according to claim 2, wherein the transfer memory comprises:

a first partition dedicated to storing digital data being transferred from the first network to the second network, and a second partition dedicated to storing digital data being transferred from the second network to the first network.

4. A communication system between a first network and a second network, the system comprising:

a transfer device for transferring digital data according to claim 1, and a transfer controller for controlling the transfer of digital data through the transfer device, said transfer controller being connected to the third communication interface of the transfer device and being independent of both the first network and the second network.

5. The system according to claim 4, the transfer controller further being configured to control the successive activation of the transmission channels by the transfer device.

6. The system according to claim 4, the transfer controller further being configured to control a first slave controller connected to the first network, with a view to transmitting to the transfer memory, via the first transmission channel, a first set of incoming digital data coming from the first network, and to store said first set of incoming data as a first set of data being transferred.

7. The system according to claim 6, the transfer controller further being configured to obtain, via the second transmission channel, the first set of data being transferred in order to perform a verification of said first set of data being transferred, said verification providing a first result indicative of compliance with or violation of at least one security rule relating to said first set of data being transferred.

8. The system according to claim 7, the transfer controller further being configured to control a second slave controller connected to the second network, with a view to transmitting the first set of data being transferred, to the second network, via the third transmission channel, as a first set of outgoing digital data, only when the first result is not indicative of any security rule violation.

9. The system according to claim 7, the transfer controller further being configured to erase, from the transfer memory, data of the first set of data being transferred, without first transmitting them via the third transmission channel, when the first result concerning the data is indicative of a violation of at least one security rule.

10. The system according to claim 9, further configured to:

control the second slave controller, with a view to transmitting to the transfer memory, via the third transmission channel, a second set of incoming digital data coming from the second network, and to store said second set of incoming data as a second set of data being transferred, obtain, via the second transmission channel, the second set of data being transferred, with a view to performing a verification of said second set of data being transferred, said verification providing a second result indicative of compliance with or violation of at least one security rule relating to said second set of data being transferred, control the first slave controller, with a view to transmitting to the first network, via the first transmission channel, the second set of data being transferred, as a second set of outgoing digital data, only when the second result is not indicative of any security rule violation, and erase, from the transfer memory, data of the second set of data being transferred, without first transmitting it via the first transmission channel, when the second result concerning the data is indicative of a violation of at least one security rule.

11. A method for transferring digital data, in a communication system, between a first network and a second network, by means of a transfer device comprising:

a first communication interface with the first network, a second communication interface with the second network, a third communication interface with a transfer controller for controlling the transfer of digital data through the transfer device, a fourth communication interface, and a transfer memory connected to the fourth communication interface, the method comprising successively receiving by the transfer device first a first command to activate a first transmission channel through the first and fourth communication interface, then a second command to activate a second transmission channel through the third and fourth communication interface, and finally a third command to activate a third transmission channel through the second and fourth communication interface the commands resulting from controlling, by a transfer controller, two binary switches within the transfer device, the method comprising:

after receiving the first command to activate the first transmission channel, simultaneously activate the first transmission channel and deactivate the second and third transmission channels, after receiving the second command to activate the second transmission channel, simultaneously activate the second transmission channel and deactivate the first and third transmission channels, and after receiving the third command to activate the third transmission channel, simultaneously activate the third transmission channel and deactivate the first and second transmission channels, such that no physical connection between the first network and the second network is ever established, and no physical connection between the first or second network on the one hand, and the transfer controller on the other hand, is ever established.

12. The method according to claim 11, comprising:

transmitting to the transfer memory, via the first transmission channel, a first set of incoming digital data coming from the first network, with a view to their transfer as a first set of data being transferred, communicating to the transfer controller, via the second transmission channel, the first set of data being transferred, with a view to performing a verification of said first set of data being transferred, said verification providing a first result indicative of compliance with or violation of at least one security rule relating to said first set of data being transferred, transmitting to the second network, via the third transmission channel, the first set of data being transferred, as a first set of outgoing digital data, only when the first result is not indicative of any security rule violation, and erasing, from the transfer memory, data from the first set of data being transferred, when the first result concerning these data is indicative of a violation of at least one security rule.

13. The method according to claim 11, comprising the following steps implemented by the transfer controller:

triggering an activation of the first transmission channel, sending a start of a transmission signal to a first slave controller connected to the first network, after an allotted time, sending an end of the transmission signal to the first slave controller, triggering an activation of the second transmission channel, reading and verifying some or all of the contents of the transfer memory, optionally, erasing some or all of the contents of the transfer memory, and triggering an activation of the third transmission channel.

14. A non-transitory computer-readable storage medium storing one or more instructions for implementing the method according to claim 11 when the one or more instructions are executed by a processor.

* * * * *